United States Patent [19]
Raymond

[11] Patent Number: 4,870,994

[45] Date of Patent: Oct. 3, 1989

[54] AIR ACCUMULATOR

[76] Inventor: James H. Raymond, 459 Cross St., Boylston, Mass. 01505

[21] Appl. No.: 145,464

[22] Filed: Jan. 19, 1988

[51] Int. Cl.[4] .............................................. A01G 25/09

[52] U.S. Cl. ................................ 137/899.4; 137/382; 137/883

[58] Field of Search ............... 137/377, 382, 613, 883, 137/899.4

[56] References Cited

U.S. PATENT DOCUMENTS 1,756,806 4/1930 Beach .............................. 137/899.4

2,804,259 8/1957 Ralston ............................ 137/899.4

2,812,895 11/1957 Peeps .............................. 137/899.4

3,964,508 6/1976 Miller ................................ 137/377

*Primary Examiner*—A. Michael Chambers

*Attorney, Agent, or Firm*—Blodgett & Blodgett

[57] ABSTRACT

A portable air accumulator for pneumatic tools comprising a air tank which is mounted on a supporting base. The air accumulator also includes an inlet fixture for connecting the tank to an air compressor and a plurality of outlet fixtures for connecting the tank to a plurality of pneumatic tools.

6 Claims, 2 Drawing Sheets

AIR ACCUMULATOR

BACKGROUND OF THE INVENTION

The present invention is directed to an air accumulator for use with pneumatic tools. Pneumatic tools are used extensively in the building and automotive trades. At the present time, each pneumatic tool is connected to its own compressor so that as more pneumatic tools are used, more compressors have to be utilized as well. This represents a large capital expenditure. Also, each compressor has a greater capacity than the air tool so that most of the time, the compressor is idle. At the same time, if the pneumatic tool is being used steadily, there is a tendency for the air pressure to drop so that, on occasion, the operator of the tool has to wait for the air pressure to build up again before use of the tool can be resumed. This results in loss of production and inefficient use of tools, time and equipment. These and other difficulties experienced with the prior art devices have been obviated by the present invention.

It is, therefore, a principal object of the invention to provide a portable air accumulator which can be used in conjunction with an air compressor and a plurality of pneumatic tools.

Another object of this invention is the provision of a portable air accumulator which enables an air compressor to be utilized more efficiently.

A further object of the present invention is the provision of a portable air accumulator which enables a plurality of pneumatic tools to be used in conjunction with a single air compressor while maintaining the air pressure for all of the tools at a constant normal operating value.

It is another object of the present invention to provide a portable air accumulator which can be used with a plurality of tools and which can be adjusted so that the tools can be operated at different pressures and the air pressure to each tool can be adjusted.

A still further object of the invention is to provide a portable air pressure device which can be used in conjunction with a compressor and a plurality of pneumatic tools and which is adjustable for maintaining the air pressure of the air to the tools at a lower value than the pressure of the air from the compressor.

It is a further object of the invention to provide a portable air accumulator which is simple in construction and which is capable of a long life of usable service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of a portable air accumulator for pneumatic tools which comprises an enclosed container mounted on a supporting base, an inlet fixture for connection to an air compressor by a flexible air line and at least two outlet fixtures for connection to pneumatic tools by means of flexible air lines. More specifically, the air accumulator includes an adjustable air valve for each fixture and guard elements to protect the valves during use of the accumulator on a job site.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
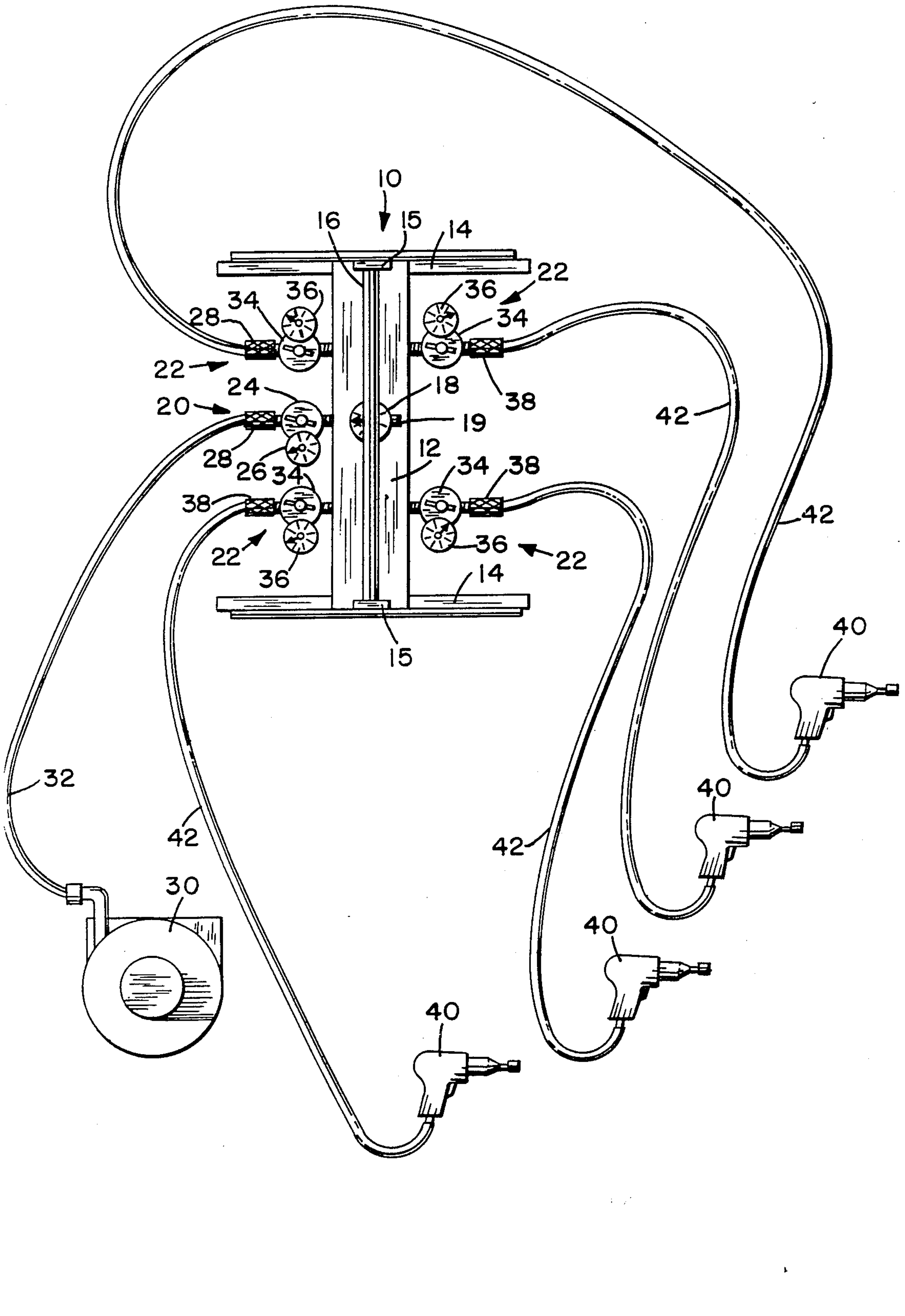
FIG. 1 is a plan view of an air accumulator embodying the principle of the present invention.
Figure 2:
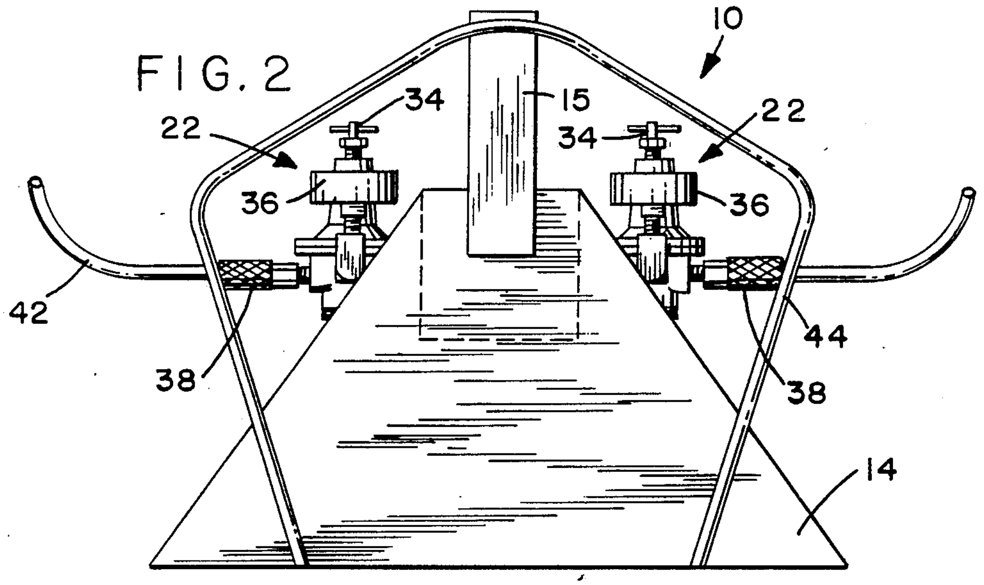
FIG. 2 is a front elevational view of the air accumulator.
Figure 3:
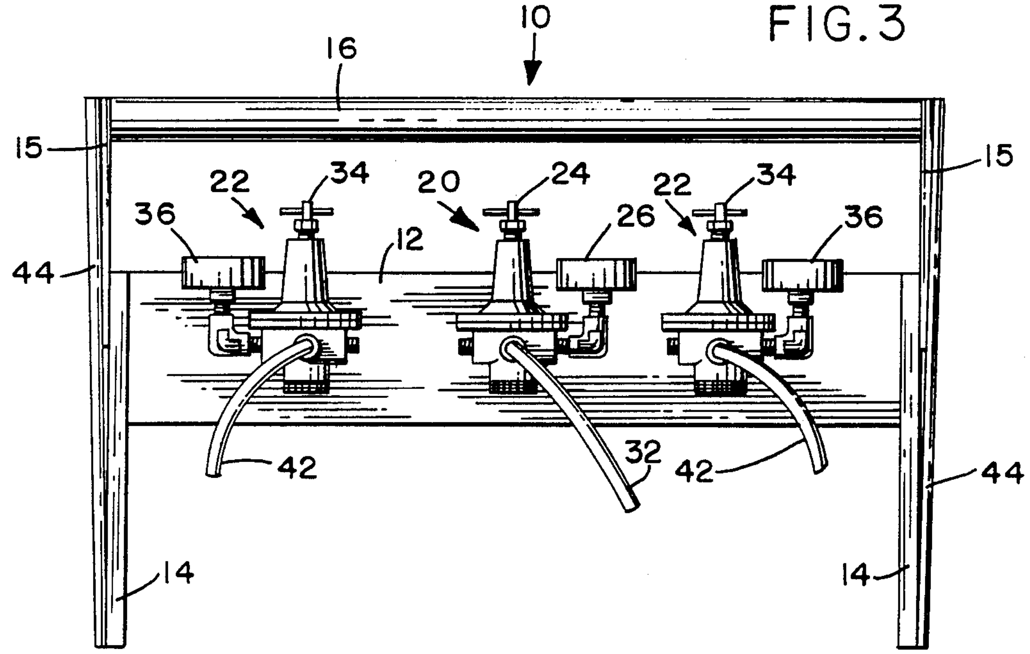
FIG. 3 is a left-side elevational view of the air accumulator.

Referring to the drawings, the air accumulator of the present invention is generally indicated by the reference numeral 10 and comprises an elongated tubular member 12 which is sealed at both ends by a pair of plates 14 which also function as supporting legs for the accumulator. An upwardly extending bracket 15 is attached to the top end of each plate 14. A carrying handle 16 is fixed to the brackets 15 so that it extends across the top of the tubular member or tank 12. A pressure gauge 18 is operatively connected to the top of the tank and includes a pressure relief valve 19. The accumulator 10 also includes an inlet fixture generally indicated by the reference numeral 20 and a plurality of outlet fixtures generally indicated by the reference numeral 22. The fixtures 20 and 22 are operatively connected to the interior of the tank 12. The inlet fixture 20 includes an adjustable valve 24, an air gauge 26, and a connector 28 which enables the inlet fixture to be connected to an air compressor 30 by means of a flexible air line 32. The valve 24 is utilized to regulate the pressure of the air which enters the tank 12 from the compressor 30. The gauge 26 is operatively connected to the valve 24 to provide a visual indication of the pressure of the air which enters the tank 12.

Each outlet fixture 22 comprises an adjustable valve 34, an air gauge 36, and a connector 38, which enables the fixture to be connected to a pneumatic tool 40 by means of a flexible air line 42. The adjustable valve 34 selectively controls the air pressure to the pneumatic tool from the tank 12. This pressure is indicated by the air gauge 36. Each end of the air accumulator is provided with a guard 44 which protects the fixtures 20 and 22 from falling objects and from being damaged if the accumulator is accidentally knocked over.

The operation and advantages of the present invention will now be readily understood in view of the above description. The air accumulator 10 can be carried by hand to a work area such as a construction site by grasping the carrying handle 16. The accumulator is strategically positioned at the work site and connected to the compressor 30 by means of the air line 32. The air tools 40 are connected to the outlet fixtures 22 by means of air lines 42. Although the air accumulator 10 includes four outlet fixtures for four air tools, additional outlet fixtures can be employed, if desired. Air compressors have built-in accumulators and regulators for maintaining the air pressure within the built-in accumulator at a predetermined pressure. Normally, the air compressor is activated when the air pressure within the built in accumulator reaches a predetermined low value and is deactivated when the air pressure within the built in accumulator reaches a predetermined high value. The inlet valve 20 is preferable set so that the pressure of air to the tank 12 is below the lowest predetermined pressure of the accumulator. The valves 22 are set so that the pressure of the air which is supplied to the air tools 40 is less than the pressure within the tank 12. Since a plurality of air tools 40 are utilized, there is a constant draw of air from the tank 12 and there is relatively steady demand of air from the compressor 30 to the accumulator 10. As a result, the compressor 30 has a tendency to run longer during its running phase and the air pressure to all the tools 40 never falls below the predetermined operating pressure. Also, since all of the valves 36 are independently adjustable, different tools having different normal operating pressures can be utilized with the present invention.

It is obvious that minor changes may be made in the form and construction of the invention without departing from the material spirit thereof. It is not, however, desired to confine the invention to the exact form herein shown and described, but it is desired to include all such as properly come within the scope claimed.

The invention being thus described, what is claimed as new and desired to secure by Letters Patent is:

1. A portable air accumulator for pneumatic tools for use with a compressor assembly having a motor, an air compressor and an air storage tank, said accumulator comprising:

(a) an enclosed container for holding a quantity of compressed air, (b) a supporting base which is fixed to the bottom of the container, (c) an inlet fixture which is connected to the container for operatively connecting the container to said air compressor at a remote location by an air line, and (d) at least two outlet fixtures which are connected to the container for operatively connecting said container to at least two pneumatic tools at remote locations by means of air lines, each of said outlet fixtures having an independently adjustable air pressure valve.

2. A portable air accumulator as recited in claim 1, wherein said container is an enlongated tube and said supporting base comprises a pair of supporting elements which are fixed to opposite ends of said tube.

3. A portable air accumulator as recited in claim 2, wherein said tube is open at each end and wherein each of said supporting elements is a flat plate which seals the corresponding end of the tube.

4. A portable air accumulator as recited in claim 2, wherein a guard is attached to each supporting element, each of said guards extending transversely and outwardly of said container beyond each of said fixtures.

5. A portable air accumulator as recited in claim 2, wherein a carrying handle is fixed to each of said supporting elements and extends between said supporting elements.

6. A portable air accumulator as recited in claim 1, wherein each of said outlet fixtures includes an air gauge which is operatively connected to the corresponding air pressure valve.

* * * * *